P. COBURN.
TOOLS FOR CUTTING LEATHER, &c.

No. 178,273. Patented June 6, 1876.

Witnesses.
J. Hunnewell.
N. E. Boardman.

Inventor.
P. Coburn.
F. Curtis, Atty.

UNITED STATES PATENT OFFICE.

PHINEHAS COBURN, OF EAST WALPOLE, MASSACHUSETTS.

IMPROVEMENT IN TOOLS FOR CUTTING LEATHER, &c.

Specification forming part of Letters Patent No. 178,273, dated June 6, 1876; application filed May 1, 1876.

*To all whom it may concern:*

Be it known that I, PHINEHAS COBURN, of East Walpole, Norfolk county, Massachusetts, have invented an Instrument for Cutting Paper, Leather, &c., of which the following is a specification:

This instrument is designed to cut, in a rapid and smooth manner, paper, leather, and kindred materials; and consists in the employment, with a suitable "stock," of a rotary cutting-disk, and a self-adjusting depth-gage, substantially as hereinafter explained, the stock being provided with a suitable handle, and the whole being arranged and operating in manner as will be explained.

Figure 1:
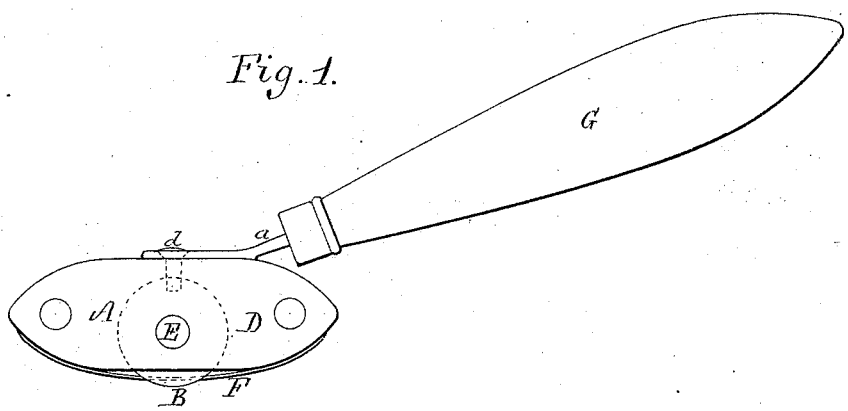
Figure 2:
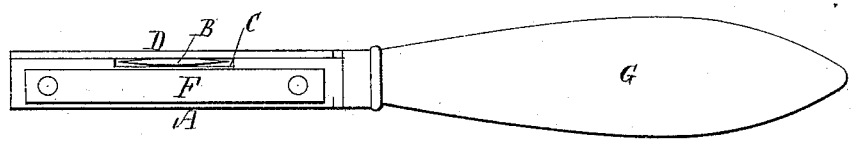
Figure 3:
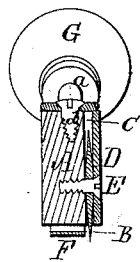
Figure 4:
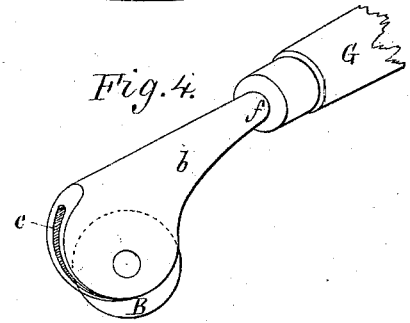

The drawings accompanying this specification represent, in Figure 1, a side elevation, in Fig. 2 an under side view, and in Fig. 3 a vertical cross-section, of an instrument embodying my invention. Fig. 4 represents a modification of my invention, to be explained.

In these drawings, A represents an upright oblong block, which constitutes a base or stock for the cutter, which is shown at B as a thin circular disk of steel, with its perimeter reduced to a sharp edge, such cutter being disposed within a pocket, C, created in one side of the stock B, and covered by a thin plate or guard, D, the cutter being mounted upon a horizontal pin or journal, E, which extends through it and the stock, as represented, and so that such cutter is free to revolve upon its axis. To the lower edge or bottom of the stock A I secure a thin plate, F, of spring metal, this plate being crowning at center, and springing away from the bottom of the stock, and constituting a yielding bearing or support for the said stock.

By exerting greater or less downward pressure upon the stock by means of the handle G, with which such stock is provided, the resistance offered by the spring-plate F is overcome to a greater or less extent, and the cutter is buried to the desired extent in the material to be cut. The plate F thus becomes a self-adjusting depth-gage, to determine the extent to which the cutter shall protrude below the stock A, and consequently the depth to which it shall enter the material to be cut.

In the use of this instrument it is to be pushed or drawn along the material to be cut, and pressure applied by means of its handle. As the instrument advances the knife rolls or trundles, and its sharp perimeter buries itself continuously in the material which is to be cut with a certain and smooth action, and as the action of the cutter is a direct impact and not a drawing or shear cut, no difficulty is experienced in cutting any desired materials, even to thin metals, while for the same reason little wear is exerted upon such cutter, and it seldom requires sharpening.

When a long straight cut is to be made a "straight-edge" should be employed, and the knife-stock pressed up to it as the cutting proceeds.

The shank or support $a$ of the handle may be pivoted to the center of the stock, as shown at $d$ in the accompanying drawing, by which means its position may be reversed end for end of the latter, should occasion require.

Fig. 4 of the drawings represents a modified construction of my invention, in which the stock is a thin metallic bar, $b$, incised at one end, as shown at $c$, to receive the cutter B, and with its opposite end or shank $f$ inserted in a handle, G.

This construction is exceedingly cheap, and is effective to the extent to which the cutter protrudes beyond the lower edge of the stock; but it contains no adjustable depth-gage.

Having thus described the nature and uses of my invention, I claim, and desire to secure by Letters Patent, the following:

An implement for cutting paper, leather, or other thin substances, the same consisting of the stock A, rotary cutter B, self-adjusting depth-gage F, and handle G, the cutter being journaled within the stock, and the knife swiveled to the center of the latter, in order to be reversible, and the whole being substantially as and for the purposes stated.

PHINEHAS COBURN.

Witnesses:
 W. E. BOARDMAN,
 F. CURTIS.